US008732289B2

(12) United States Patent
Li et al.

(10) Patent No.: US 8,732,289 B2
(45) Date of Patent: May 20, 2014

(54) METHOD, APPARATUS, AND SYSTEM FOR CONTROLLING EXECUTION OF AN AUTOMATIC PROCESS

(75) Inventors: Yuping Li, Shenzhen (CN); Wei Wang, Shenzhen (CN); Lan Zou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 25 days.

(21) Appl. No.: 13/235,929

(22) Filed: Sep. 19, 2011

(65) Prior Publication Data

US 2012/0011231 A1 Jan. 12, 2012

Related U.S. Application Data

(63) Continuation of application No. PCT/CN2009/070910, filed on Mar. 20, 2009.

(51) Int. Cl.
*G06F 15/173* (2006.01)
*H04L 12/28* (2006.01)
*H04Q 11/00* (2006.01)

(52) U.S. Cl.
USPC .................... 709/223; 370/412; 370/260

(58) Field of Classification Search
USPC .......................................... 370/412; 709/223
See application file for complete search history.

(56) References Cited

U.S. PATENT DOCUMENTS

| | | | |
|---|---|---|---|
| 5,167,035 A | 11/1992 | Mann et al. | |
| 5,970,243 A * | 10/1999 | Klein et al. | 717/113 |
| 6,647,016 B1 * | 11/2003 | Isoda et al. | 370/412 |
| 2003/0071840 A1 | 4/2003 | Huang et al. | |
| 2003/0097550 A1 | 5/2003 | Chauvel et al. | |
| 2004/0268183 A1 | 12/2004 | Haselden et al. | |
| 2006/0221870 A1 * | 10/2006 | Morikawa et al. | 370/260 |
| 2007/0255817 A1 * | 11/2007 | Kuwabara et al. | 709/223 |
| 2008/0005286 A1 | 1/2008 | Short et al. | |

FOREIGN PATENT DOCUMENTS

| | | |
|---|---|---|
| CN | 1573713 A | 2/2005 |
| CN | 1606276 | 4/2005 |
| CN | 1627290 | 6/2005 |
| CN | 1752946 | 3/2006 |

(Continued)

OTHER PUBLICATIONS

First Chinese Office Action (partial translation) of Chinese Application No. 200980100676.5, mailed Oct. 8, 2011 (9 pgs.).

(Continued)

*Primary Examiner* — Emmanuel L Moise
*Assistant Examiner* — Mahran Abu Roumi
(74) *Attorney, Agent, or Firm* — Leydig, Voit & Mayer, Ltd.

(57) ABSTRACT

The present invention discloses a method for controlling execution of an automatic process. The method includes: receiving a resume command that carries stoppoint information; determining whether the stoppoint information carried in the resume command is the same as information about a current stoppoint of a current automatic process; and resuming the current automatic process from the current stoppoint when the stoppoint information carried in the resume command is the same as the information about the current stoppoint. The present invention also discloses another method for controlling execution of an automatic process, a system, a management apparatus, an automatic apparatus, a computer program product, and a computer readable storage medium, ensuring that the automatic process is executed in accordance with user expectations.

16 Claims, 6 Drawing Sheets

(56) References Cited

FOREIGN PATENT DOCUMENTS

| CN | 101110656 | 1/2008 |
| CN | 101262375 A | 9/2008 |
| CN | 101321101 | 12/2008 |

OTHER PUBLICATIONS

Extended European search report, pursuant to Rule 62 EPC, the supplementary European search report (Art. 153(7) EPC) and the European search opinion related to Application No. 09841716.5-2416 (PCT/CN2009070910), mailed Nov. 2, 2011, for Huawei Tech Co. Ltd. (9 pgs.).
3GPP TS 32.532 V8.0.0 (Dec. 2008); $3^{rd}$ Generation Partnership Project; Technical Specification Group Services and System Aspects; Telecommunication management; Software management Integration Reference Point (IRP); Information Service (IS) (Release 8) (33 pgs.).
3GPP TSG-SA5 (Telecom Management) Meeting SA5#65, May 11-15, 2009; Tallinn, Estonia (S5-092302); Change Request TS 32.532 CR CRNum V.8.0.0; Title: Add start step parameter for resume operation; Source to WG: Huawei, Nokia Siemens Networks; Source to TSG: SA5; Work Item Code:OAM8; Category: F (4 pgs.).
Second office action in corresponding Chinese patent application No. 200980100676.5 (Aug. 20, 2012).
Rejection Decision in corresponding Chinese Patent Application No. 200980100676.5 (Feb. 27, 2013).
International Search Report from P.R. China in International Application No. PCT/CN2009/070910, mailed Dec. 24, 2009.
Written Opinion of the International Search Authority related to International Application No. PCT/CN2009/070910, mailed Dec. 24, 2009, for Huawei Technologies Co., Ltd.

* cited by examiner

METHOD, APPARATUS, AND SYSTEM FOR CONTROLLING EXECUTION OF AN AUTOMATIC PROCESS

CROSS-REFERENCE TO RELATED APPLICATIONS

This application is a continuation of International Application No. PCT/CN2009/070910, filed on Mar. 20, 2009, which is hereby incorporated by reference in their entireties.

FIELD OF THE INVENTION

The present invention relates to the field of communications technologies, and in particular, to a method, an apparatus, and a system for controlling execution of an automatic process.

BACKGROUND OF THE INVENTION

A series of preparations must be made before a network element is deployed on a communications network to provide normal communications services. The preparations include three stages: data preparation stage, hardware installation stage, and the stage from power-on to formal service provisioning.

The data preparation stage includes activities such as some engineering survey jobs and use of a planning tool to generate configuration data required by an equipment. The hardware installation stage means that hardware installation engineers install hardware and connect the network element to a specified physical network after the hardware is transported to a site. The stage from power-on to formal service provisioning involves the following jobs: configuring network parameters such as an Internet Protocol (IP) address for the network element; installing software for the network element; providing the configuration data prepared at the data preparation stage for the network element; and verifying whether the network element is able to provide normal services. All jobs before the stage from power-on to formal service provisioning are manually completed by engineers at the site. To increase efficiency, the jobs at the stage from power-on to formal service provisioning can currently be completed through automatic configuration. Automatic configuration means that the jobs at the stage from power-on to formal service provisioning are automatically completed through interactions between the network element and an Element Management System (EMS).

Although an automatic configuration process can be automatically executed, a user may expect to intervene during the process instead of allowing complete automatic execution in certain circumstances. For this purpose, a stoppoint is adopted. Before execution of an automatic configuration process, the user sets a stoppoint in a critical step of the process. When running to a stoppoint, the execution of the automatic configuration process is stopped. The stopped execution is resumed after the user executes a resume operation. An automatic configuration process in the prior art is as follows:

The automatic configuration process is executed in order. When a stoppoint is met, the execution is stopped and an Integration Reference Point Agent (IRPAgent) sends a notification message to an Integration Reference Point Manager (IRPManager), waiting for a resume operation of the user. The IRPManager may send a resume command to the IRPAgent. After receiving the resume command, the IRPAgent resumes the automatic configuration process from the current stoppoint.

Through researches on the prior art, the inventor discovers the following problem: The automatic configuration process is resumed from the current stoppoint after the resume command is received. If multiple stoppoints are set for one automatic configuration process, the process stops at the first stoppoint. When two IRPManagers send two resume commands with respect to the first stoppoint at a short interval, after receiving the first resume command with respect to the first stoppoint, the IRPAgent resumes the automatic configuration process from the first stoppoint. If the process goes to the second stoppoint when the second resume command with respect to the first stoppoint arrives, the IRPAgent are triggered by the second resume command to resume the automatic configuration process from the second stoppoint. In this way, when two resume commands with respect to the first stoppoint are received, the automatic configuration process is resumed respectively from the first and the second stoppoints, while the user expects that the process be resumed only from the first stoppoint. As a result, actual operations are inconsistent with user expectations.

SUMMARY OF THE INVENTION

Embodiments of the present invention provide a method, an apparatus, and a system for controlling execution of an automatic process so as to ensure that the automatic process is executed in accordance with user expectations.

An embodiment of the present invention provides a method for controlling execution of an automatic process. The method includes:
  receiving a resume command that carries stoppoint information;
  determining whether the stoppoint information carried in the resume command is the same as information about a current stoppoint of a current automatic process; and
  resuming the current automatic process from the current stoppoint when the stoppoint information carried in the resume command is the same as the information about the current stoppoint.

An embodiment of the present invention provides another method for controlling execution of an automatic process. The method includes:
  obtaining stoppoint information;
  generating a resume command that carries the stoppoint information; and
  sending the resume command.

Another embodiment of the present invention provides an automatic apparatus. The apparatus includes:
  a receiving unit, configured to receive a resume command that carries stoppoint information;
  a determining unit, configured to determine whether information about a current stoppoint is the same as the stoppoint information carried in the resume command received by the receiving unit; and
  a processing unit, configured to resume a current automatic process from the current stoppoint when the determining unit determines that the information about the current stoppoint is the same as the stoppoint information carried in the resume command received by the receiving unit.

Another embodiment of the present invention provides a management apparatus. The management apparatus includes:
  an obtaining unit, configured to obtain stoppoint information;

a generating unit, configured to generate a resume command that carries the stoppoint information obtained by the obtaining unit; and a sending unit, configured to send the resume command generated by the generating unit.

Another embodiment of the present invention provides a system for controlling execution of an automatic process. The system includes:

a management apparatus, configured to: obtain stoppoint information, generate a resume command that carries the stoppoint information, and send the generated resume command; and an automatic apparatus, configured to: receive the resume command sent by the management apparatus and identify the stoppoint information in the resume command; determine whether information about a current stoppoint is the same as the stoppoint information; and resume a current automatic process from the current stoppoint when determining that the information about the current stoppoint is the same as the stoppoint information.

Another embodiment of the present invention provides a computer program product. The product includes a computer program code, which, when being executed by a computer, enables the computer to execute any step in the preceding methods for controlling execution of an automatic process.

Another embodiment of the present invention provides a computer readable storage medium. The computer readable storage medium stores a computer program code, which, when being executed by a computer, enables the computer to execute any step in the preceding methods for controlling execution of an automatic process.

In technical solutions provided by the embodiments of the present invention, the current automatic process is resumed from the current stoppoint only when the stoppoint information carried in the resume command is the same as the information about the current stoppoint. This ensures that the automatic process is executed in accordance with user expectations.

BRIEF DESCRIPTION OF THE DRAWINGS

The following detailed description is directed to the technical solutions of the present invention with reference to the accompanying drawings. Apparently, the embodiments to be described are only part of, rather than all of, the embodiments of the present invention. Those skilled in the art can derive other embodiments from the embodiments given herein without making any creative effort, and all such embodiments are covered in the protection scope of the present invention.

DETAILED DESCRIPTION OF THE EMBODIMENTS

The following detailed description is directed to the technical solutions of the present invention with reference to the accompanying drawings. Apparently, the embodiments to be described are only part of, rather than all of, the embodiments of the present invention. Those skilled in the art can derive other embodiments from the embodiments given herein without making any creative effort, and all such embodiments are covered in the protection scope of the present invention.

Figure 1:
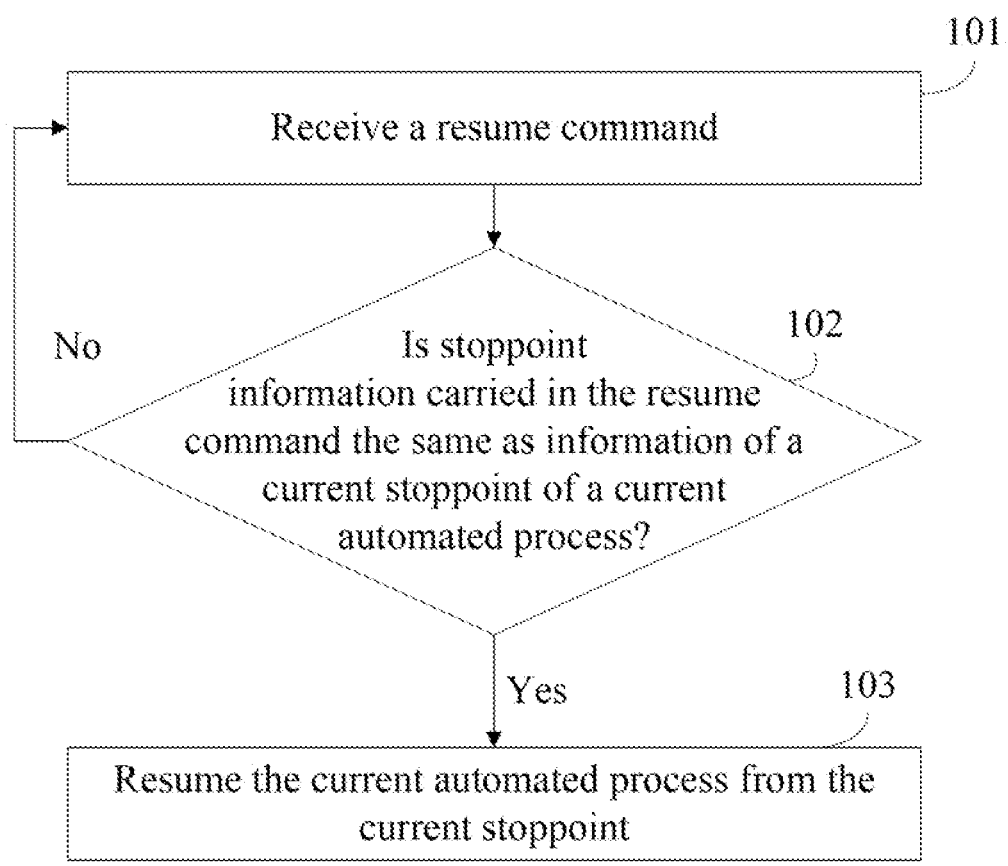
FIG. 1 is a flowchart of a method for controlling execution of an automatic process according to a first embodiment of the present invention.

FIG. 1 shows a procedure of a method for controlling execution of an automatic process according to a first embodiment of the present invention. The embodiment describes a processing procedure of an automatic apparatus. The procedure includes the following steps:

101. Receive a resume command that carries stoppoint information.

A stoppoint is set by a user according to a step list of an automatic process before execution of the automatic process. If a stoppoint is met in the automatic process, the automatic apparatus stops the automatic process. After stopping the automatic process, the automatic apparatus receives a resume command from a management apparatus. The automatic process may be an automatic software management process or an automatic configuration process.

During the automatic process, stoppoint information: is in a one-to-one mapping with stoppoints. That is, one stoppoint corresponds to only one piece of stoppoint information, which may be a stoppoint name, a stoppoint identifier (ID), or other information that can uniquely identify a stoppoint.

102. Determine whether the stoppoint information carried in the resume command is the same as information about a current stoppoint of a current automatic process. If the stoppoint information carried in the resume command is the same as the information about the current stoppoint of the current automatic process, go to step 103; if the stoppoint information carried in the resume command is different from the information about the current stoppoint of the current automatic process, repeat step 101.

The current automatic process may be an automatic process existing in a system and the current stoppoint is a stoppoint where the current automatic process is stopped.

103. Resume the current automatic process from the current stoppoint.

When the stoppoint information carried in the resume command is the same as the information about the current stoppoint where the current automatic process is stopped, the resume command is intended for the current stoppoint. The current automatic process is therefore resumed from the current stoppoint. This ensures that the stoppoint from which the automatic process is resumed is a start point where the user expects to resume the automatic process.

If information about a current stoppoint of only one current automatic process is the same as the stoppoint information carried in the resume command, only the current automatic process is resumed from the current stoppoint; if information about current stoppoints of multiple current automatic processes is the same as the stoppoint information carried in the resume command, the multiple automatic processes may all be resumed from the current stoppoint.

From the preceding description, it is known that the current automatic process is resumed from the current stoppoint when the stoppoint information carried in the resume command is the same as the information about the current stoppoint. This ensures that the automatic process is executed in accordance with user expectations.

Figure 2:
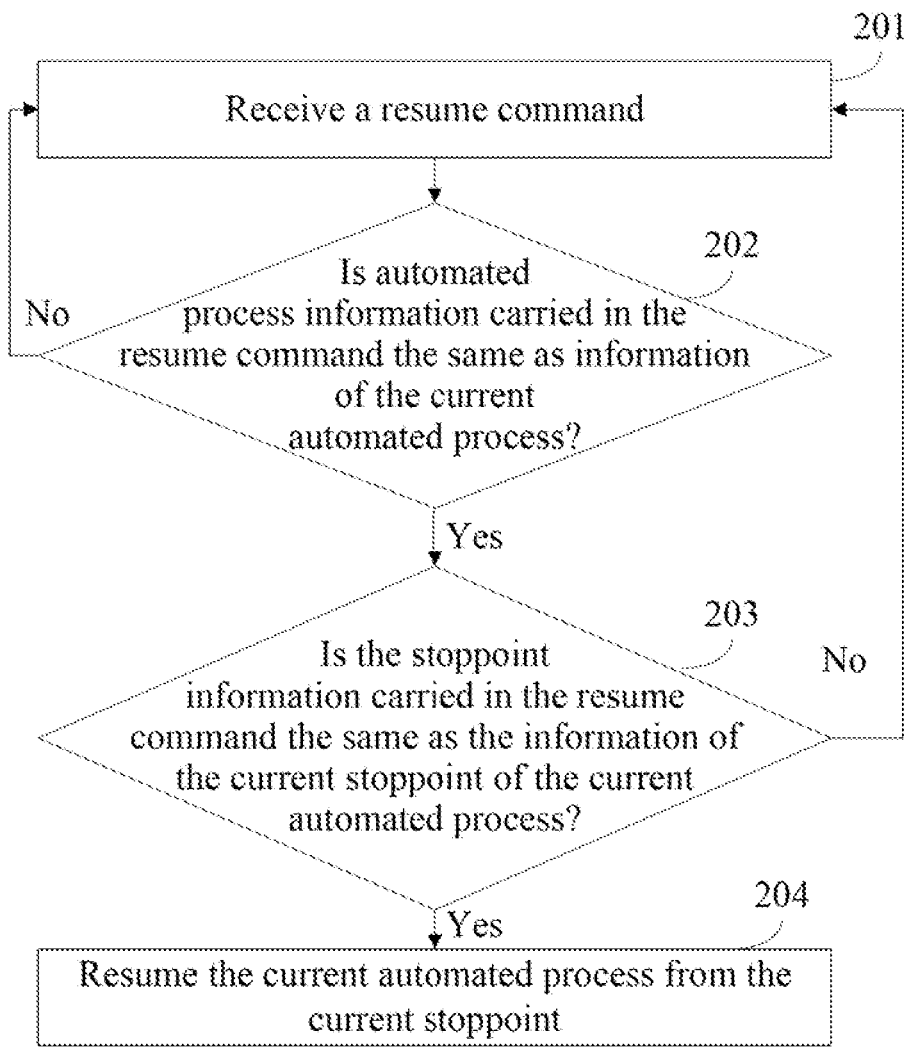
FIG. 2 is a flowchart of a method for controlling execution of an automatic process according to a second embodiment of the present invention.

FIG. 2 shows a procedure of a method for controlling execution of an automatic process according to a second embodiment of the present invention. This embodiment also describes a processing procedure of an automatic apparatus. The procedure includes:

201. Receive a resume command that carries stoppoint information and automatic process information.

Step 201 may be executed with reference to step 101. The automatic process information may be a name or an ID of an automatic process or other information that can uniquely identify the automatic process.

The resume command may be sent by a management apparatus according to a defined rule when no notification message is received.

202. Determine whether the automatic process information carried in the resume command is the same as information about a current automatic process.

If the automatic process information carried in the resume command is the same as the information about the current automatic process, go to step 203; if the automatic process information carried in the resume command is different from the information about the current automatic process, repeat step 201.

203. Determine whether the stoppoint information carried in the resume command is the same as information about a current stoppoint.

If the stoppoint information carried in the resume command is the same as the information about the current stoppoint, go to step 204; if the stoppoint information carried in the resume command is different from the information about the current stoppoint, repeat step 201.

Step 203 and step 202 have no sequential relationship. That is, step 203 may be executed before step 202.

204. Resume the current automatic process from the current stoppoint.

Specifically, the current automatic process that matches both the stoppoint information and the automatic process information is resumed from the current stoppoint.

From the preceding description, it is known that the current automatic process is resumed from the current stoppoint only when the stoppoint information carried in the resume command is the same as the information about the current stoppoint and the automatic process information carried in the resume command is the same as the information about the current automatic process. This ensures that the automatic process is executed in accordance with user expectations.

It is understandable that the received resume command may also carry stoppoint information and time information; or carry stoppoint information, automatic process information, and time information. Accordingly, the current automatic process is resumed from the current stoppoint at the time matching the time information carried in the resume command.

Figure 3:
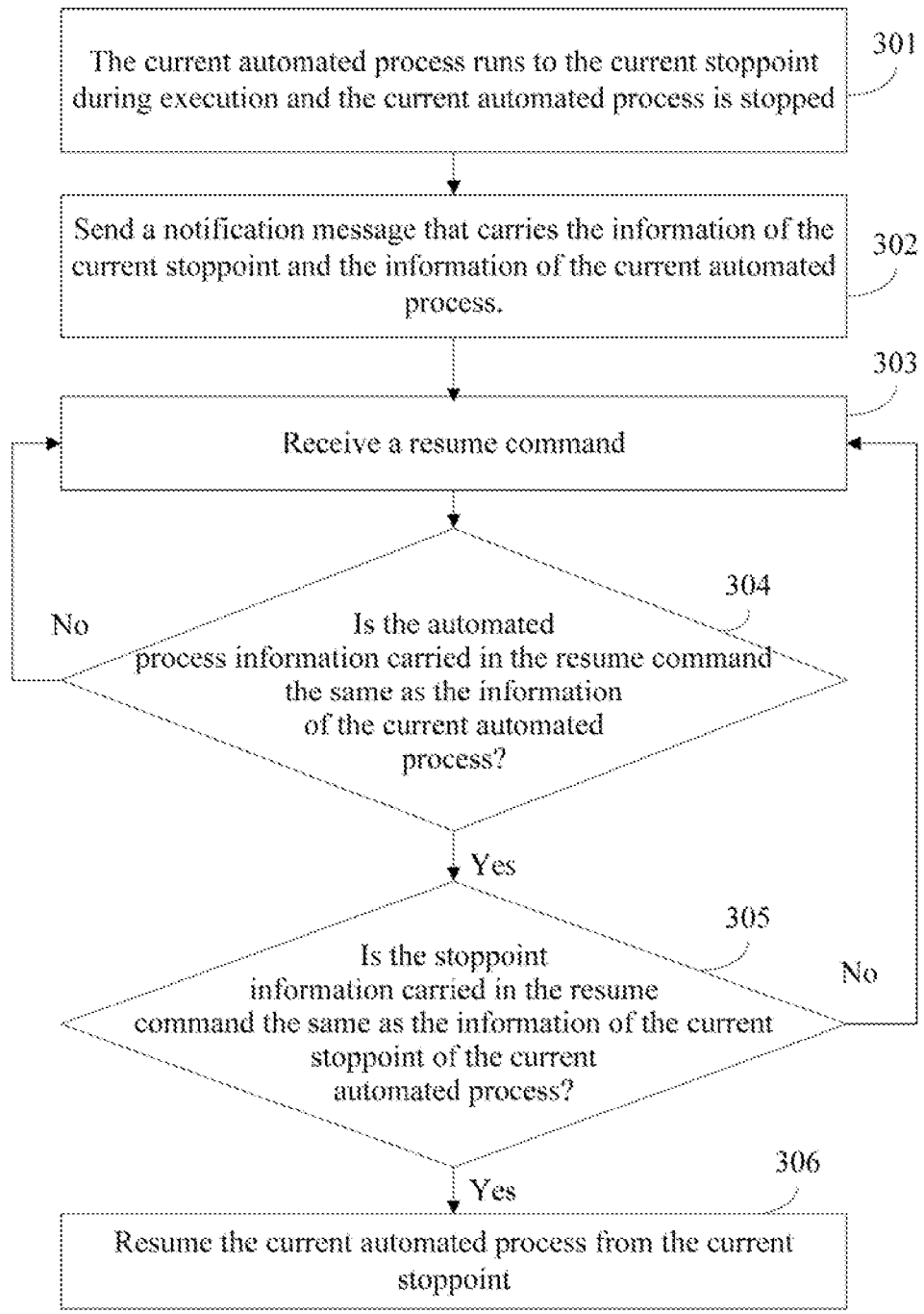
FIG. 3 is a flowchart of a method for controlling execution of an automatic process according to a third embodiment of the present invention.

FIG. 3 shows a procedure of a method for controlling execution of an automatic process according to a third embodiment of the present invention. This embodiment also describes a processing procedure of an automatic apparatus. The procedure includes:

301. A current automatic process runs to a current stoppoint when being executed and the current automatic process is stopped.

302. Send a notification message that carries information about the current stoppoint and information about the current automatic process.

One automatic process matches one piece of automatic process information. During an automatic process, one stoppoint matches one piece of stoppoint information. Therefore, one stoppoint can be uniquely identified by one piece of automatic process information and one piece of stoppoint information.

The notification message may be sent to a management apparatus.

It is understandable that the notification message may carry only information about the current stoppoint.

303. Receive a resume command that carries stoppoint information and automatic process information.

304. Determine whether the automatic process information carried in the resume command is the same as the information about the current automatic process. If the automatic process information carried in the resume command is the same as the information about the current automatic process, go to step 305; if the automatic process information carried in the resume command is different from the information about the current automatic process, repeat step 303.

305. Determine whether the stoppoint information carried in the resume command is the same as the information about the current stoppoint. If the stoppoint information carried in the resume command is the same as the information about the current stoppoint, go to step 306; if the stoppoint information carried in the resume command is different from the information about the current stoppoint, repeat step 303.

Step 304 and step 305 have no sequential relationship. That is, step 305 may be executed before step 304.

306. Resume the current automatic process from the current stoppoint.

Specifically, the current automatic process that matches both the stoppoint information and automatic process information is resumed from the current stoppoint.

From the preceding description, it is known that the current automatic process is resumed from the current stoppoint only when the stoppoint information carried in the resume command is the same as the information about the current stoppoint and the automatic process information carried in the resume command is the same as the information about the current automatic process. This ensures that the automatic process is executed in accordance with user expectations. In addition, the stoppoint information and the automatic process information may be sent to the management apparatus so that the management apparatus may directly obtain the stoppoint information and the automatic process information, which improves processing efficiency of the management apparatus.

Figure 4:
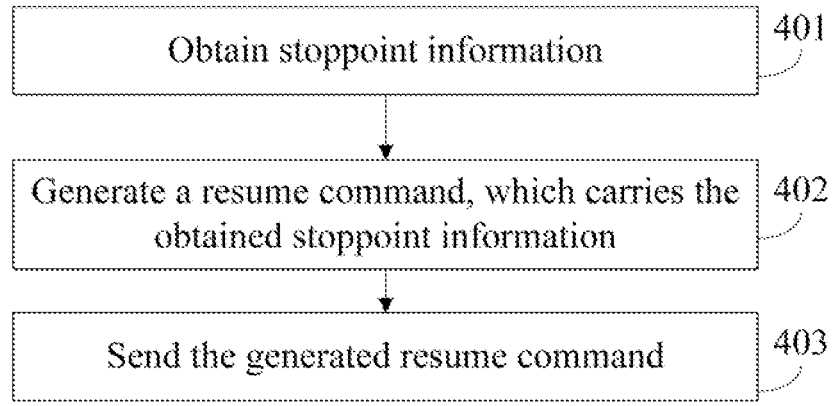
FIG. 4 is a flowchart of a method for controlling execution of an automatic process according to a fourth embodiment of the present invention.

Further, if the resume command received by the automatic apparatus carries time information, the current automatic process is resumed from the current stoppoint at the time matching the time information. FIG. 4 shows a procedure of a method for controlling execution of an automatic process according to a fourth embodiment of the present invention. This embodiment describes a processing procedure of a management apparatus. The procedure includes:

401. Obtain stoppoint information.

The stoppoint information may be obtained from a notification message that is sent by an automatic apparatus at a stoppoint of an automatic process.

The stoppoint information may also be obtained through a command, such as a list process command. After a list process command is entered, execution status of each automatic process is displayed, including whether a stoppoint is met in each automatic process and information about a current stoppoint.

402. Generate a resume command that carries the obtained stoppoint information.

After obtaining the stoppoint information, the management apparatus may automatically generate a resume command according to a configuration; or the management apparatus may display indication information to a user and generate a resume command when being triggered by the user.

403. Send the generated resume command.

Specifically, the management apparatus may send the generated resume command to the automatic apparatus.

From the preceding description, it is known that the resume command generated in this embodiment carries the stoppoint information carried in the notification message so that an executor of the automatic process resumes a current automatic process from the current stoppoint when the stoppoint information carried in the resume command is the same as the information about the current stoppoint after the process executor receives the resume command. This ensures that the automatic process is executed in accordance with user expectations.

Figure 5:
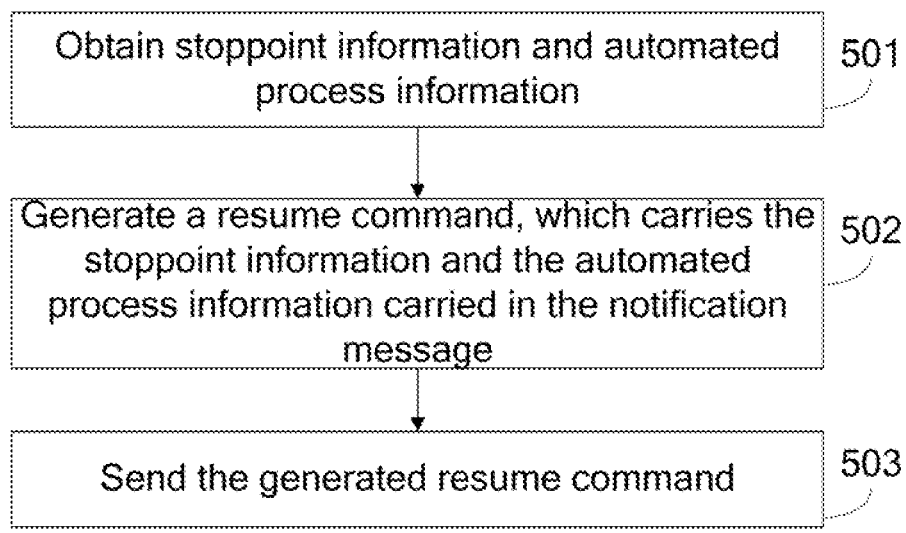
FIG. 5 is a flowchart of a method for controlling execution of an automatic process according to a fifth embodiment of the present invention.

FIG. 5 shows a procedure of a method for controlling execution of an automatic process according to a fifth embodiment of the present invention. The procedure described in this embodiment is a processing procedure of a management apparatus. The procedure includes:

501. Obtain stoppoint information and automatic process information.

The stoppoint information and the automatic process information may be obtained from a notification message that is sent by an automatic apparatus at a stoppoint of an automatic process.

The automatic process information may also be obtained through a command such as a list process command. After the list process command is entered, execution status of each automatic process is displayed, including information about each automatic process, whether a stoppoint is met during each automatic process, and information about a current stoppoint.

502. Generate a resume command that carries the stoppoint information and automatic process information carried in the notification message.

After obtaining the stoppoint information and the automatic process information, the management apparatus may automatically generate a resume command according to a defined rule; or the management apparatus may display indication information to a user and generate a resume command when being triggered by the user.

503. Send the generated resume command.

Specifically, the management apparatus may send the generated resume command to the automatic apparatus.

From the preceding description, it is known that the resume command generated in this embodiment carries the stoppoint information and automatic process information carried in the notification message so that an executor of the automatic process resumes a current automatic process from the current stoppoint only when the stoppoint information carried in the resume command is the same as the information about the current stoppoint and the automatic process information carried in the resume command is the same as information about the current automatic process. This ensures that the automatic process is executed in accordance with user expectations.

Figure 6:
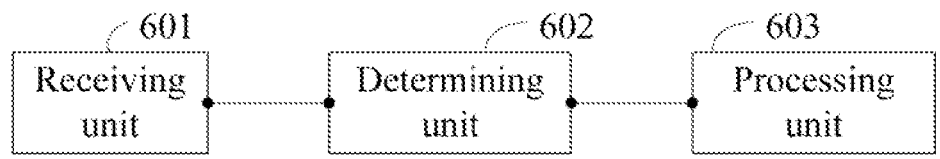
FIG. 6 is a block diagram of an apparatus for controlling execution of an automatic process according to a first embodiment of the present invention.

Further, the management apparatus may obtain time information and include the time information in the generated resume command so that the automatic apparatus can resume the automatic process at the time matching the time information. Specifically, the management apparatus may obtain the time information from a preset configuration file or receive the time information entered by the user. Embodiments of the present invention provide an automatic apparatus that may be an IRPAgent. FIG. 6 shows a structure of the automatic apparatus according to a first embodiment of the present invention. The automatic apparatus includes:

a receiving unit 601, configured to receive a resume command that carries stoppoint information;

a determining unit 602, configured to determine whether information about a current stoppoint is the same as the stoppoint information carried in the resume command received by the receiving unit 601; and a processing unit 603, configured to resume a current automatic process from the current stoppoint when the determining unit 601 determines that the information about the current stoppoint is the same as the stoppoint information carried in the resume command received by the receiving unit 601.

From the preceding description, it is known that the automatic apparatus provided in this embodiment of the present invention resumes the current automatic process from the current stoppoint only when the stoppoint information carried in the resume command is the same as the information about the current stoppoint. This ensures that the automatic process is executed in accordance with user expectations.

Figure 7:
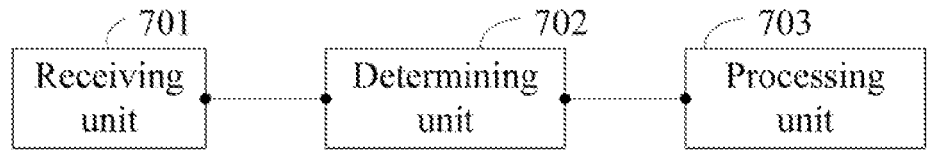
FIG. 7 is a block diagram of an apparatus for controlling execution of an automatic process according to a second embodiment of the present invention.

FIG. 7 shows a structure of the automatic apparatus according to a second embodiment of the present invention. The automatic apparatus includes:

a receiving unit 701, configured to receive a resume command that carries stoppoint information and automatic process information;

a determining unit 702, configured to determine whether information about a current stoppoint is the same as the stoppoint information carried in the resume command received by the receiving unit 701 and whether information about a current automatic process is the same as the automatic process information carried in the resume command received by the receiving unit 701; and a processing unit 703, configured to resume the current automatic process from the current stoppoint when the determining unit 702 determines that the information about the current stoppoint is the same as the stoppoint information carried in the resume command received by the receiving unit 701 and that the information about the current automatic process is the same as the automatic process information carried in the resume command received by the receiving unit 701.

From the preceding description, it is known that the automatic apparatus provided in this embodiment of the present invention resumes the current automatic process from the current stoppoint only when the stoppoint information carried in the resume command is the same as the information about the current stoppoint and the automatic process information carried in the resume command is the same as the information about the current automatic process. This ensures that the automatic process is executed in accordance with user expectations.

Figure 8:
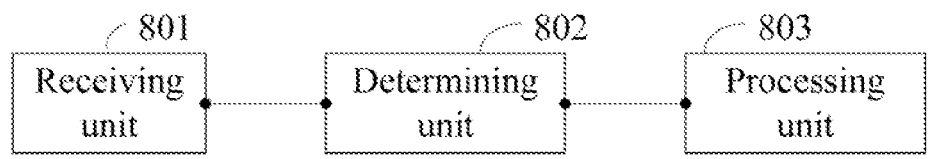
FIG. 8 is a block diagram of an apparatus for controlling execution of an automatic process according to a third embodiment of the present invention.

FIG. 8 shows a structure of the automatic apparatus according to a third embodiment of the present invention. The automatic apparatus includes:

a receiving unit 801, configured to receive a resume command that carries stoppoint information, automatic process information, and time information;

a determining unit 802, configured to determine whether information about a current stoppoint is the same as the stoppoint information carried in the resume command received by the receiving unit 801 and whether information about a current automatic process is the same as the automatic process information carried in the resume command received by the receiving unit 801; and a processing unit 803, configured to resume the current automatic process from the current stoppoint at the time matching the time information carried in the resume command received by the receiving unit 801 when the determining unit 802 determines that the information about the current stoppoint is the same as the stoppoint information carried in the resume command received by the receiving unit 801 and that the information about the current automatic process is the same as the automatic process information carried in the resume command received by the receiving unit 801.

From the preceding description, it is known that the automatic apparatus in this embodiment of the present invention resumes the current automatic process from the current stoppoint only at the time matching the time information carried in the resume command. This ensures that the automatic process is executed in accordance with user expectations.

Figure 9:
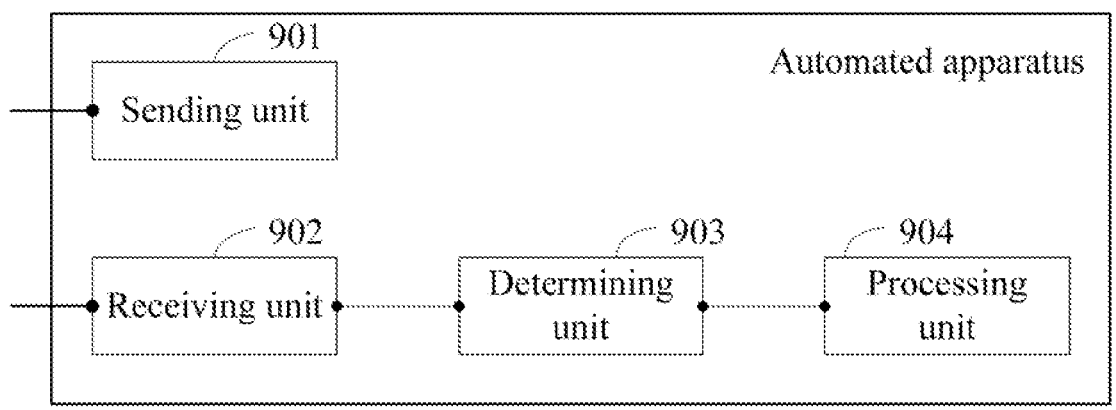
FIG. 9 is a block diagram of an apparatus for controlling execution of an automatic process according to a fourth embodiment of the present invention.

FIG. 9 shows a structure of the automatic apparatus according to a fourth embodiment of the present invention. The automatic apparatus includes:

a sending unit 901, configured to send a notification message that carries information about a current stoppoint and information about a current automatic process;

a receiving unit 902, configured to receive a resume command that carries stoppoint information and automatic process information;

a determining unit 903, configured to determine whether the information about the current stoppoint is the same as the stoppoint information carried in the resume command received by the receiving unit 902 and whether the information about the current automatic process is the same as the automatic process information carried in the resume command received by the receiving unit 902; and a processing unit 904, configured to resume the current automatic process from the current stoppoint when the determining unit 903 determines that the information about the current stoppoint is the same as the stoppoint information carried in the resume command received by the receiving unit 902 and that the information about the current automatic process is the same as the automatic process information carried in the resume command received by the receiving unit 902.

From the preceding description, it is known that the automatic apparatus including the sending unit in this embodiment of the present invention can send the information about the current stoppoint and the information about the current automatic process to the management apparatus. In this way, the management apparatus may directly obtain the information about the current stoppoint and the information about the current automatic process, which improves the processing efficiency.

Figure 10:
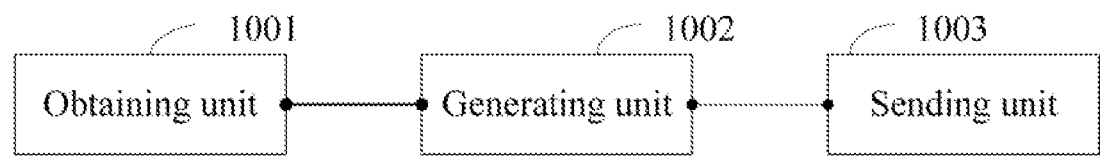
FIG. 10 is a block diagram of a management apparatus according to a first embodiment of the present invention.

Embodiments of the present invention provide a management apparatus that may be an IRPManager. FIG. 10 shows a structure of the management apparatus according to a first embodiment of the present invention. The management apparatus includes: an obtaining unit 1001, a generating unit 1002, and a sending unit 1003.

The obtaining unit 1001 is configured to obtain stoppoint information.

Specifically, the obtaining unit 1001 may directly obtain the stoppoint information through a list process command; or the obtaining unit 1001 may receive, from an automatic apparatus, a notification message that carries the stoppoint information so as to obtain the stoppoint information from the notification message.

The generating unit 1002 is configured to generate a resume command that carries the stoppoint information obtained by the obtaining unit 1001.

The sending unit 1003 is configured to send the resume command generated by the generating unit 1002.

From the preceding description, it is known that the resume command generated by the management apparatus in this embodiment carries the stoppoint information. In this way, after receiving the resume command, the automatic apparatus resumes a current automatic process from a current stoppoint only when the stoppoint information carried in the resume command is the same as information about the current stoppoint. This ensures that the automatic process is executed in accordance with user expectations.

A management apparatus provided in a second embodiment of the present invention includes:

an obtaining unit, configured to obtain stoppoint information and automatic process information;

a generating unit, configured to generate a resume command that carries the stoppoint information and automatic process information obtained by the obtaining unit; and a sending unit, configured to send the resume command generated by the generating unit.

From the preceding description, it is known that the resume command generated by the management apparatus in this embodiment carries the stoppoint information and automatic process information carried in the notification message. In this way, after receiving the resume command, the automatic apparatus resumes a current automatic process from a current stoppoint only when the stoppoint information carried in the resume command is the same as information about the current stoppoint and the automatic process information carried in the resume command is the same as information about the current automatic process. This ensures that the automatic process is executed in accordance with user expectations.

A management apparatus provided in a third embodiment of the present invention includes:

an obtaining unit, configured to obtain stoppoint information, automatic process information, and time information;

a generating unit, configured to generate a resume command that carries the stoppoint information, automatic process information, and time information obtained by the obtaining unit; and a sending unit, configured to send the resume command generated by the generating unit.

From the preceding description, it is known that the resume command generated by the management apparatus in the embodiment carries the stoppoint information so that the automatic apparatus resumes a current automatic process from a current stoppoint only at the time matching the time information carried in the resume command. This ensures that the automatic process is executed according to user expectations.

Figure 11:
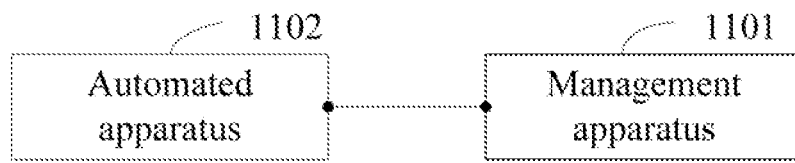
FIG. 11 is a block diagram of a system for controlling execution of an automatic process according to an embodiment of the present invention.

FIG. 11 shows a structure of a system for controlling execution of an automatic process provided in an embodiment of the present invention. The system includes a management apparatus 1101 and an automatic apparatus 1102, where:

The management apparatus 1101 is configured to: obtain stoppoint information, generate a resume command that carries the stoppoint information, and send the generated resume command.

The automatic apparatus 1102 is configured to: receive the resume command sent by the management apparatus 1101 and identify the stoppoint information in the resume command; determine whether information about a current stoppoint is the same as the identified stoppoint information; and resume a current automatic process from the current stoppoint when determining that the information about the current stoppoint is the same as the identified stoppoint information.

From the preceding description, it is known that the automatic apparatus in the system for controlling execution of an automatic process in this embodiment of the present invention resumes the current automatic process from the current stoppoint only when the stoppoint information carried in the resume command is the same as the information about the current stoppoint. This ensures that the automatic process is executed in accordance with user expectations.

Persons having ordinary skill in the art may understand that all or part of steps of methods according to the embodiments of the present invention may be implemented by a computer program instructing relevant hardware. The program may be stored in a computer readable storage medium. When the program is executed, the steps of the methods according to the embodiments of the present invention are performed. The storage medium may be a magnetic disk, a Compact Disk Read-Only Memory (CD-ROM), a Read-Only Memory (ROM), or a Random Access Memory (RAM).

The method, apparatus and system for controlling execution of an automatic process provided in the embodiments of the present invention are described in detail only for the purpose of helping people understand the technical solutions and ideas of the present invention. Those skilled in the art can make variations and modifications to the present invention in terms of the specific implementations and application scopes according to the ideas of the present invention. Therefore, the specification shall not be construed as limitations to the present invention.

What is claimed is:

1. A method for controlling execution of an automatic process, comprising:
    sending, by a first device to a second device, a notification message that carries information about a first stop point which is set in the first device, and information about a first automatic process which is currently running on the first device, wherein when the first automatic process runs to the first stop point, the first device stops running the first automatic process;
    receiving, by the first device, a resume command that carries information about a second stop point and information about a second automatic process sent from the second device after the notification message is received by the second device, wherein the resume command further carries time information indicating a time point;
    determining, by the first device, whether the information about the first automatic process is the same as the information about the second automatic process;
    if it has been determined by the first device that the information about the first automatic process is the same as the information about the second automatic process, determining, by the first device, whether the information of the second stop point carried in the resume command is the same as the information of the first stop point;
    resuming, by the first device, the first automatic process from the first stop point according to the resume command only when the information of the second stop point carried in the resume command is the same as the information of the first stop point; and
    waiting, by the first device, at the first stop point of the first automatic process, when the information of the second stop point carried in the resume command is not the same as the information of the first stop point.

2. The method of claim 1, wherein
    the step of resuming, by the first device, the automatic process from the first stop point according to the resume command comprises:
    resuming, by the first device the first automatic process from the first stop point according to the resume command at the time point indicated by the time information.

3. The method of claim 1, wherein the resume command is generated according to the notification message, and the information about the second stop point carried in the resume command is identical to the information about the first stop point in the notification message.

4. A method for controlling execution of an automatic process, comprising:
    receiving, by a second device from a first device, a notification message that carries information of a first stop point which is set in the first device, and information about a first automatic process which is currently running on the first device, wherein when the first automatic process runs to the first stop point, the first device stops running the first automatic process;
    generating, by the second device, a resume command that carries information about a second stop point and information about a second automatic process after receiving the notification message, wherein the resume command further carries time information indicating a time point; and
    sending, by the second device, the resume command to the first device,
    wherein the resume command is used for the first device to determine whether the information about the first automatic process is the same as the information about the second automatic process, and, if it has been determined by the first device that the information about the first automatic process is the same as the information about the second automatic process, whether the information about the second stop point carried in the resume command is the same as the information about the first stop point; and
    the first device resumes the first automatic process from the first stop point according to the resume command only when the information about the second stop point carried in the resume command is the same as the information about the first stop point; and waits at the first stop point of the first automatic process, when the information about the second stop point carried in the resume command is not the same as the information about the first stop point.

5. The method of claim 4, wherein
the time information in the resume command is used for the first device resumes the first automatic process from the first stop point according to the resume command at the time point indicated by the time information.

6. The method of claim 4, wherein the resume command is generated according to the notification message, and the information about the second stop point carried in the resume command is identical to the information about the first stop point in the notification message.

7. A non-transitory computer readable medium storing a computer program code, which, when being executed by a computer, causes the computer to execute steps of:
sending to a device, a notification message that carries information about a first stop point which is set in the computer, and information about a first automatic process which is currently running on the computer, wherein when the first automatic process runs to the first stop point, the computer stops running the first automatic process;
receiving from the device a resume command that carries information about a second stop point and information about a second automatic process sent from the device after the notification message is received by the device, wherein the resume command further carries time information indicating a time point;
determining, whether the information about the first automatic process is the same as the information about the second automatic process;
determining whether the information about the second stop point carried in the resume command is the same as the information about the first stop point;
resuming the first automatic process from the first stop point according to the resume command only when the information about the second stop point carried in the resume command is the same as the information about the first stop point; and
waiting, at the first stop point of the first automatic process, when the information about the second stop point carried in the resume command is not the same as the information about the first stop point.

8. The method of claim 7, wherein the resume command is generated according to the notification message, and the information about the second stop point carried in the resume command is identical to the information about the first stop point in the notification message.

9. A non-transitory computer readable medium storing a computer program code, which, when being executed by a computer, causes the computer to execute steps of:
receiving from a device, a notification message that carries information about a first stop point which is set in the device, and information about a first automatic process which is currently running on the device, wherein when the first automatic process runs to the first stop point, the device stops running the first automatic process;
generating a resume command that carries information about a second stop point and information about a second automatic process after receiving the notification message, wherein the resume command further carries time information indicating a time point; and
sending the resume command to the device, wherein the resume command is used for the device to determine whether the information about the first automatic process is the same as the information about the second automatic process, and, if it has been determined by the first device that the information about the first automatic process is the same as the information about the second automatic process, whether the information about the second stop point carried in the resume command is the same as the information about the first stop point; and the device resumes the first automatic process from the first stop point according to the resume command only when the information about the second stop point carried in the resume command is the same as the information about the first stop point; and waits at the first stop point of the first automatic process, when the information about the second stop point carried in the resume command is not the same as the information about the first stop point.

10. The method of claim 9, wherein the resume command is generated according to the notification message, and the information about the second stop point carried in the resume command is identical to the information about the first stop point in the notification message.

11. An automatic apparatus, comprising:
a transmitter, configured to send to a device a notification message that carries information about a first stop point which is set in the automatic apparatus, and information about a first automatic process which is currently running on the device, wherein when the first automatic process runs to the first stop point, the automatic apparatus stops running the first automatic process;
a receiver, configured to receive a resume command that carries information about a second stop point and information about a second automatic process sent from the device after the notification message is received by the device, wherein the resume command further carries time information indicating a time point;
a processor, configured to determine whether the information about the first automatic process is the same as the information about the second automatic process, and, if it has been determined by the first device that the information about the first automatic process is the same as the information about the second automatic process, whether the information about the second stop point carried in the resume command is the same as the information about the first stop point; and resume the first automatic process from the first stop point according to the resume command only when the information about the second stop point carried in the resume command is the same as the information about the first stop point; and wait at the first stop point of the first automatic process, when the information about the second stop point carried in the resume command is not the same as the information about the first stop point.

12. The automatic apparatus of claim 11, wherein:
the processor is configured to resume the automatic process from the first stop point according to the resume command at the time point indicated by the time information when the second stop point carried in the resume command is the same as the first stop point.

13. The method of claim 11, wherein the resume command is generated according to the notification message, and the information about the second stop point carried in the resume command is identical to the information about the first stop point in the notification message.

14. A management apparatus, comprising:
a receiver, configured to receive from a device, a notification message that carries information about a first stop point which is set in the first device, and information about a first automatic process which is currently running on the device, wherein when the first automatic process runs to the first stop point, the device stops running the first automatic process;

a processor, configured to generate a resume command that carries information about a second stop point and information about a second automatic process after the reception of the notification message, wherein the resume command further carries time information indicating a time point; and a transmitter, configured to send the generated resume command to the device, wherein the resume command is used for the first device to determine whether the information about the first automatic process is the same as the information about the second automatic process, and, if it has been determined by the first device that the information about the first automatic process is the same as the information about the second automatic process, whether the information about the second stop point carried in the resume command is the same as the information about the first stop point; and the device resumes the first automatic process from the first stop point according to the resume command only when the information about the second stop point carried in the resume command is the same as the information about the first stop point; and waits at the first stop point of the first automatic process, when the information about the second stop point carried in the resume command is not the same as the information about the first stop point.

15. The management apparatus of claim 14, wherein the time information in the resume command is used for the first device resumes the automatic process from the first stop point according to the resume command at the time point indicated by the time information.

16. A system for controlling execution of an automatic process, comprising: a management apparatus and an automatic apparatus;

wherein the management apparatus is configured to: receive from the automatic apparatus, a notification message that carries a first stop point which is set in the automatic apparatus, and information about a first automatic process which is currently running on the device, wherein when the first automatic process runs to the first stop point, the automatic apparatus stops running the first automatic process; generate a resume command that carries information about a second stop point and information about a second automatic process after receiving the notification message, wherein the resume command further carries time information indicating a time point; and send the resume command to the automatic apparatus; and the automatic apparatus is configured to: send to the management apparatus, the notification message that carries the information about the first stop point and the information about a first automatic process; receive from the management apparatus, the resume command; determine whether the information about the first automatic process is the same as the information about the second automatic process, and, if it has been determined by the first device that the information about the first automatic process is the same as the information about the second automatic process, whether the information about the second stop point carried in the resume command is the same as the information about the first stop point; resume the first automatic process from the first stop point according to the resume command, only when the information about the second stop point carried in the resume command is the same as the information about the first stop point; and wait at the first stop point of the first automatic process, when the information about the second stop point carried in the resume command is not the same as the information about the first stop point.

\* \* \* \* \*